(12) United States Patent
Tsai et al.

(10) Patent No.: US 6,486,598 B1
(45) Date of Patent: Nov. 26, 2002

(54) COMPACT FLUORESCENT LAMP AND METHOD FOR MANUFACTURING

(75) Inventors: Kuang Lung Tsai, Hsinchu (TW); Chun Hui Tsai, Hsinchu (TW)

(73) Assignee: Industrial Technology Research Institute, Hsin Chu (TW)

( * ) Notice: Subject to any disclaimer, the term of this patent is extended or adjusted under 35 U.S.C. 154(b) by 0 days.

(21) Appl. No.: 09/206,039

(22) Filed: Dec. 4, 1998

(51) Int. Cl.[7] .............................................. H01J 63/04
(52) U.S. Cl. ...................................... 313/493; 313/485
(58) Field of Search ................................ 313/486, 485, 313/484, 483, 493, 487, 488, 491, 492

(56) References Cited

U.S. PATENT DOCUMENTS

| | | | | |
|---|---|---|---|---|
| 3,581,137 A | * | 5/1971 | Arnott et al. ................ | 313/112 |
| 4,243,909 A | * | 1/1981 | Brecher et al. ............. | 313/487 |
| 4,281,271 A | * | 7/1981 | Young et al. ................ | 313/493 |
| 4,469,986 A | * | 9/1984 | Tsuchihashi et al. ........ | 313/610 |
| 4,816,719 A | * | 3/1989 | Maya et al. ................ | 313/610 |
| 4,871,942 A | * | 10/1989 | Burgmans et al. .......... | 313/493 |
| 5,479,069 A | * | 12/1995 | Winsor ....................... | 313/493 |
| 5,767,618 A | * | 6/1998 | Maya et al. ................ | 313/493 |

* cited by examiner

Primary Examiner—Vip Patel
Assistant Examiner—Joseph Williams
(74) Attorney, Agent, or Firm—Tung & Associates (57) ABSTRACT

A compact fluorescent lamp for illumination which is constructed by planar glass plates formed of a low cost sodium glass material and assembled together by a sealing glass adhesive, or a glass frit, such that a low cost compact fluorescent lamp that has maximum electrical discharge path can be fabricated in mass production. The compact flourescent lamp has a chamber cavity that is divided into a plurality of sub-chambers by interior partitions each having an aperture therethrough for allowing a discharge to go through into a neighboring sub-chamber. The placement of the aperture is such that a maximum discharge path, or a maximum arc path can be achieved while maintaining the total volume of the compact lamp at a minimum. The use of flat glass plates made of a low cost sodium glass material enables a low cost manufacturing of the present invention novel lamp. Complex and expensive shaping of glass tubes into bent or curved tubes utilized in conventional compact flourescent lamps are completely eliminated in the present invention novel method.

18 Claims, 5 Drawing Sheets

COMPACT FLUORESCENT LAMP AND METHOD FOR MANUFACTURING

FIELD OF THE INVENTION

The present invention generally relates to a compact fluorescent lamp and a method for manufacturing such lamp and more particularly, relates to a compact fluorescent lamp that can be fabricated by adhesively bonding planar glass plates together forming a hermetically sealed chamber having interior partitions therein dividing a chamber cavity into a plurality of sub-chambers with fluid communication thereinbetween such that a maximum length of passageway for an electrical discharge may be achieved resulting in an improved brightness of the lamp, and a method for manufacturing such lamp.

BACKGROUND OF THE INVENTION

Fluorescent lamps that utilize a fluorescent coating in a glass tube and a gas filling capable of being charged to produce ultraviolet energy in order to energize the fluorescent coating have been used for a long time. The conventional fluorescent lamps are normally supplied in the form of elongated tubes of significant length, for instance, between 2 ft and 4 ft, that require a large installation space and large fixtures for holding such lamps. Due to the bulkiness of the lamps and the fixtures, conventional fluorescent lamps have only been used in industrial or commercial applications where available space for installation is not a problem. The consumer or home usages of the fluorescent lamps are limited to the 1 ft length lamps normally used in a reading lamp fixture, or the 4 ft lamps normally used in a shop light fixture. The energy saving aspect of the fluorescent lamps has therefore not been fully utilized in the consumer market, mainly due to its bulkiness and its low light intensity (or low lumen output), when the lamps are fabricated in a package that is small enough to fit inside a consumer-type light fixture.

In more recent years, there is a significant push for the use of more compact fluorescent lamps for replacing the conventional incandescent lamps caused by a high awareness of energy savings. One other benefit for using the fluorescent lamps is the longer life time of the lamps when compared to the incandescent lamps. More compact fluorescent lamps became available which are shaped in a plurality of parallelly extending tubes from a base at a predetermined length.

One obvious drawback of the compact fluorescent lamps that must be overcome before the lamps can be widely used in the consumer market is the low lumen output when compared to that from the incandescent lamps. For instance, in a conventional 20 watt straight tube fluorescent lamp which produces approximately the same lumen output as a 100 watt incandescent bulb, 4 ft length of the fluorescent lamp is required. This is the type of straight tube fluorescent lamps that are normally used in shop light fixtures. In order to produce a higher lumen output, the arc discharge length (or simply known as the discharge length), required for producing such lumen output must be maximized which leads to the problem of packaging a long tube within a small package size such that it fits in a conventional incandescent lamp fixture.

Lamp manufacturers have extended the length of the respective tube portions in a lamp envelope, or alternatively increased the number of the tube portions to as many as eight such tube portions arranged side-by-side. One example of such application produced fluorescent lamps by bending segments of glass tubings into U-shapes and sealing of one or both legs and then connecting two or more of such bent tubes with glass bridges by simultaneously blowing out a small hole near one end of the tube and then fusing them together. For instance, in a dual U-shaped lamp, the arc discharge passageway goes up one leg, down the other and then through the glass bridge into a second bent tube arrangement.

Figure 1A:
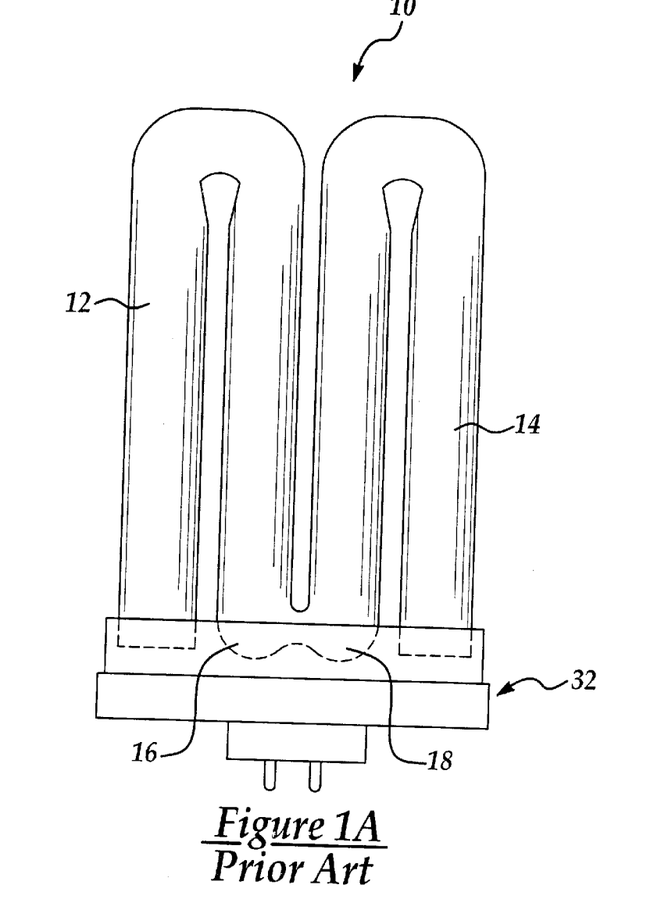
FIG. 1A is a side view of a conventional compact fluorescent lamp in a reverse W-shaped arc bulb construction.
Figure 1B:
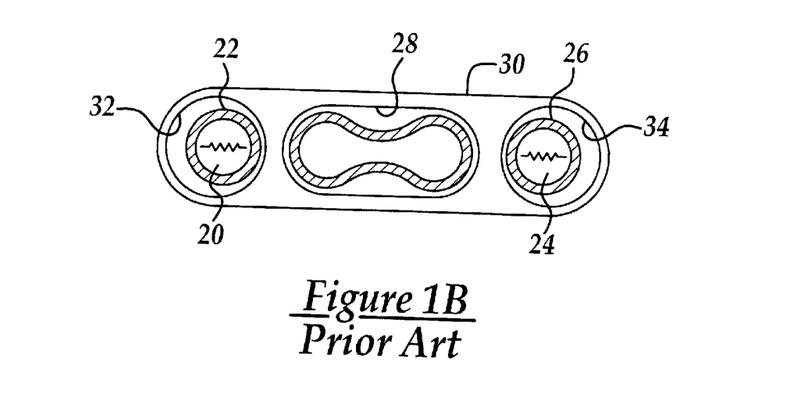
FIG. 1B is a cross-sectional view of the base of the reverse W-shaped arc bulb of FIG. 1A.

One of such designs for fluorescent lamps is shown in U.S. Pat. No. 5,252,890 and in FIGS. 1A–2B. FIGS. 1A–1B shows a compact type fluorescent lamp device that has a crooked arc path. A reversed W-shaped arc bulb 10 which includes a first U-shaped bulb 12 and a second U-shaped bulb 14. The reverse W-shaped arc bulb 10 is fabricated in the following manner. First, the outside surface of one of the ends 16 of the first U-shaped bulb 12 and the corresponding surface of one of the ends 18 of the second U-shaped bulb 14 are heated. The heated portions are closely opposed and connected to one another in a blow-off process to fluidly communicate to each other. As shown in FIG. 1B, a first electrode 20 is disposed in one end 22 of the first U-shaped bulb 12, and a second electrode 24 is arranged in the other end 26. A substantially W-shaped arc path is thus formed in the connected first and second U-shaped bulbs 12 and 14.

As shown in FIG. 1B, a wide recess 28 is formed at the center of the pedestal portion 30 of the base 32. To house the connected portion of the first and second U-shaped bulbs 12 and 14. The process further requires the formation of a pair of holes 32 and 34 at the opposite sides of the wide recess 28 in the pedestal portion 30. The other ends 22 and 26 of the first and second U-shaped bulbs 12 and 14 in which the first and second electrodes 20 and 24 are disposed are respectively inserted into the corresponding holes 32 and 34, and are further supported with an elastic bonding agent which is later filled in the pedestal portion 30. The reversed W-shaped arc bulb 10 therefore requires elaborate manufacturing steps for blowing-off portions of the glass tubes and then reconnecting them to provide fluid communication between the two U-shaped bulbs. It is an expensive manufacturing process and the product produced must be marketed at a high cost basis.

Figure 2A:
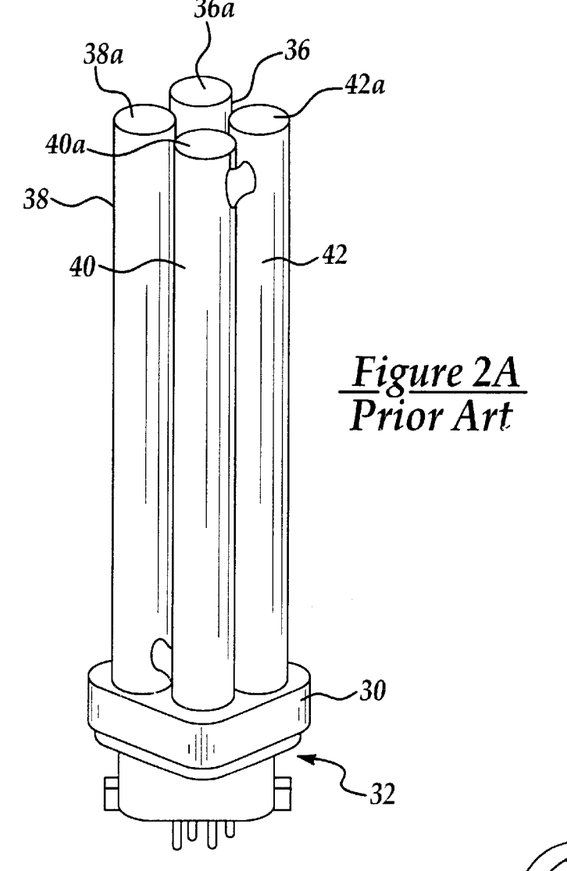
FIG. 2A is a perspective view of a parallel tube construction of a compact fluorescent lamp.
Figure 2B:
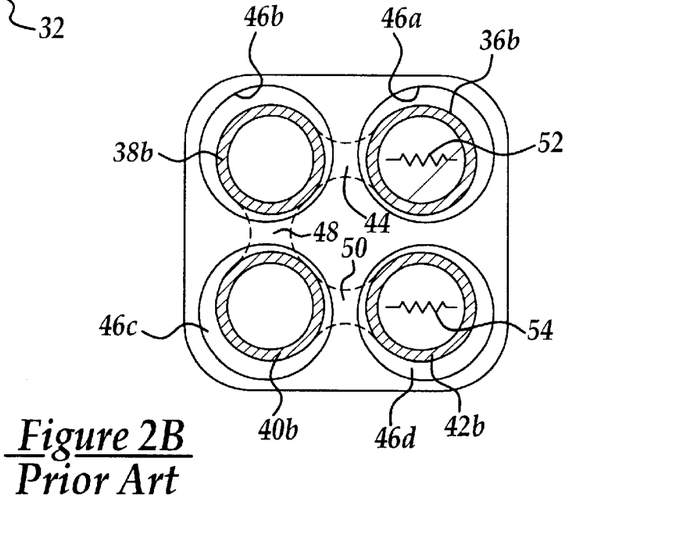
FIG. 2B is a cross-sectional view of the base portion of the compact fluorescent lamp of FIG. 2A.

In another embodiment, also disclosed in U.S. Pat. No. 5,252,890, a first, second, third and fourth straight bulbs 36, 38, 40 and 42 are rectangularly arranged on pedestal portion 30 of the base 32 extending perpendicularly from the pedestal portion 30. The extended end portion 36a of the first bulb 36 is connected to the extended end portion 38a of the second bulb 38 by a first connecting tube 44 to provide fluid communication between the two bulbs. This is shown in FIG. 2B. The base portion 36b of the first bulb 36 is disposed in a first hole 46a formed in the pedestal section 30 of the base 32. The base end portion 38b of the second bulb 38 which is opposite to the extended end portion 38a is disposed in a second hole 46b formed in the pedestal portion 30. The inner side surface of the second bulb 38, facing the third bulb 40, in the vicinity of base end portion 38b is connected to the corresponding portion of the third bulb 40 by a second connecting tube 48. This is shown in FIG. 2B. The second bulb 38 and the third bulb 40 are thus in fluid communication with each other. The extended end portion 40a of the third bulb 40 is connected to the corresponding portion 42a of the fourth bulb 42 by a third connecting tube 50 to enable fluid communication with each other. The base end portion 40b of the third bulb 40 is disposed in a third hole 46c formed in the pedestal portion 30, while the base end portion 42b of the fourth bulb 42 is disposed in a fourth hole 46d in the pedestal portion 30. A first electrode 52 is supported in the base end portion 36b of the first bulb 36, and a second electrode 54 is supported in the base end portion 42b of the fourth bulb 42. A relatively long arc path is therefore established through the first bulb 36, the first connecting tube 44, the second bulb 38, the second connecting tube 48, the third bulb 40, the third connecting tube 50 and the fourth bulb 42.

In this conventional construction of multiple-tube design, three separate passageways must be provided in connecting the four tubes together such that a single arc path can be obtained. The building of the four individual tubes and the connections must be made thereinbetween render the manufacturing process difficult and costly.

It is therefore an object of the present invention to provide a compact fluorescent lamp for illumination that does not have the drawbacks or shortcomings of the conventional compact fluorescent lamps.

It is another object of the present invention to provide a compact fluorescent lamp for illumination that can be fabricated in mass production at low cost.

It is a further object of the present invention to provide a compact fluorescent lamp for illumination wherein the lamp may be formed by planar glass plates.

It is another further object of the present invention to provide a compact fluorescent lamp for illumination wherein the lamp may be formed with low cost sodium glass.

It is still another object of the present invention to provide a compact fluorescent lamp for illumination wherein a plurality of sub-chambers are formed in a hermetically sealed chamber such that a maximum discharge length can be obtained by an arc going through the sub-chambers.

It is yet another object of the present invention to provide a compact fluorescent lamp for illumination capable of producing higher lumen output than conventional compact flourescent lamps.

It is still another further object of the present invention to provide a compact fluorescent lamp wherein a lamp chamber may be divided into four, six, nine, twelve or fifteen sub-chambers for achieving a maximum discharge length and lumen output.

It is yet another further object of the present invention to provide a method for fabricating a compact fluorescent lamp for illumination by utilizing planar glass plates of sodium glass material which are glued together by using a sealing glass, or glass frit, for simple and low cost assembly of the lamp.

It is still another further object of the present invention to provide a method for fabricating a compact fluorescent lamp for illumination wherein a flourescent powder is coated on the interior walls of the lamp by electrostatic coating or screen printing, while outwardly facing surfaces are also coated with a reflective coating material.

SUMMARY OF THE INVENTION

In accordance with the present invention, a compact fluorescent lamp for illumination and a simple, low cost method for fabricating such lamps are disclosed.

In the preferred embodiment, a compact fluorescent lamp for illumination may be provided which includes a lamp body constructed by two side walls, two end walls, a cover and a base forming a hermetically sealed chamber cavity, at least one interior partition within the chamber cavity forming at least two sub-chambers, the at least one interior partition has at least one aperture therethrough for providing fluid communication between the at least two sub-chambers, the at least one aperture is positioned on the at least one partition in such a way that a maximum length of passageway by a subsequently generated electrical discharge is achieved in said at least two sub-chambers, at least one chemical substance coated on the interior walls including the at least one interior partition and the inside surfaces of the two sidewalls, two end walls, the cover and the base, the chemical substance produces visible light when energized by ultraviolet energy, a pair of spaced-apart electrodes each situated in a different sub-chamber of the at least two sub-chambers for providing an electrical discharge in the at least two sub-chambers, and a gas filling the at least two sub-chambers which when charged by the electrical discharge emits ultraviolet energy to energize the at least one chemical substance coated on the interior walls for producing visible light.

The compact fluorescent lamp may be constructed by sidewalls, end walls, cover and base which have a planar surface. The planar surface may have either a rectangular or a square shape. The lamp may have at least two interior partitions within the chamber cavity forming four sub-chambers. The lamp may further include three apertures with one provided on each of three partitions which divide the four sub-chambers, the three apertures are positioned such that a maximum length of passageway by the electrical discharge is achieved in the four sub-chambers. The chamber may further have at least three interior partitions within the chamber cavity to form six sub-chambers.

The compact fluorescent lamp may further include five apertures with one provided on each of five partitions which divide the six sub-chambers, the five apertures are positioned such that a maximum length of travel by the electrical discharge is achieved in the six sub-chambers. The lamp may also have at least four interior partitions within the chamber cavity forming nine sub-chambers. The lamp may further include eight apertures with one provided on each of seven partitions which divide the nine sub-chambers, the eight apertures are positioned such that a maximum length of travel by the electrical discharge is achieved in the nine sub-chambers.

The chemical substance used in coating the interior walls in the chamber cavity may be a phosphor-containing substance. The chemical substance produces a visible light which may be daylight, special white light, cool white light or white light depending on the specific type of the chemical substance selected. The chemical substance may be coated on the interior walls by either an electrostatic coating method or a screen printing method. The compact fluorescent lamp may further include reflective coating layers placed on outwardly-facing interior walls in the lamp for improving its brightness. The sidewalls, end walls, cover, base and interior partitions may be formed of sodium-containing glass, and may be assembled together by adhesive means. The adhesive means utilized may be a sealing glass material, or a glass frit. The at least two sub-chambers may further include twelve sub-chambers which are formed by planar sodium glass plates.

The present invention is further directed to a method for fabricating a compact fluorescent lamp for illumination which includes the steps of first providing two sidewalls, two end walls, a cover and a base formed of planar glass plates, then assembling the sidewalls, end walls, cover and base together by adhesive means into a hermetically sealed chamber which also includes the step of dividing a cavity in the chamber into at least two sub-chambers by at least one interior partition formed of planar glass plates, the at least one interior partition has at least one aperture therethrough for providing fluid communication between the at least two sub-chambers, the at least one aperture is positioned on the at least one partition in such a way that a maximum length of passageway by a subsequently generated electrical discharge is achieved in the at least two sub-chambers, interior walls on the planar glass plates are coated with at least one chemical substance that produces visible light when excited by ultraviolet energy, then providing a pair of spaced-apart electrodes in the at least two sub-chambers with one electrode in each sub-chamber for generating an electrical discharge, then filling the at least two sub-chambers with a gas which emits ultraviolet energy when charged by the electrical discharge, and generating ultraviolet energy in the gas and energizing the at least one chemical substance to produce visible light.

The method for fabricating a compact fluorescent lamp may further include the step of assembling the sidewalls, end walls, cover and base together by gluing with a glass frit. The method may further include the step of providing the sidewalls, end walls, cover, base and the at least one interior partition in a rectangular or square shape. The method may further include the step of positioning the pair of spaced-apart electrodes at two extreme ends of the maximum length of passageway for the electrical discharge generated in the at least two sub-chambers. The method may further include the step of coating all interior walls that face outwardly away from the chamber with a reflective coating. The at least one chamber substance may be a powder that emits fluorescent light when excited by an electrical discharge.

The method may further include the step of dividing the cavity in the chamber into four sub-chambers by at least two interior partitions, or the step of dividing the cavity in the chamber into six sub-chambers by at least three interior partitions, or the step of dividing the cavity in the chamber into nine sub-chambers by at least four interior partitions.

The method for forming a compact fluorescent lamp may further include the step of coating the at least one chemical substance by an electrostatic coating method or by a screen printing method. The method may further include the step of providing the planar gas plates in sodium glass.

BRIEF DESCRIPTION OF THE INVENTION

These and other objects, features and advantages of the present invention will become apparent from the following detailed description and the appended drawings in which.

DETAILED DESCRIPTION OF THE PREFERRED AND ALTERNATE EMBODIMENTS

The present invention discloses a compact fluorescent lamp for illumination which can be fabricated by a simple manufacturing method and the method for manufacturing.

In a preferred embodiment, the compact fluorescent lamp can be fabricated utilizing planar glass plates and gluing together the planar plates with a sealing glass material, or a glass frit. The sophisticated manufacturing process required for conventional compact fluorescent lamps, i.e., such as the formation of bent or curved tubes and passageways between tubes can be eliminated. The present invention compact fluorescent lamp is particularly suitable for manufacturing in a mass production process.

A second major benefit achieved by the present invention compact fluorescent lamps is the provision of a maximum discharge length in the lamp, which leads to improved lumen output. The lamp cavity may be suitably divided into a plurality of sub-chambers by interior partitions which have apertures formed therein for providing fluid communication between any two neighboring sub-chambers. The position of the apertures in the interior partitions is such that a maximum travel length, or discharge path, or arc path can be achieved between a pair of electrodes. For instance, in the simple case of a chamber cavity divided into four sub-chambers in equal volume, an aperture may be formed in the first interior partition at an upper end of the partition for providing fluid communication between the first and the second sub-chambers. A second aperture is then provided at the bottom of a second interior partition which divides the second sub-chamber from the third sub-chamber. A third aperture is then provided at the top of the third interior partition which divides the third sub-chamber from the fourth sub-chamber with a second electrode positioned at the bottom of the fourth sub-chamber base plate. The maximum discharge length is therefore achieved in the following manner. When an electricity is applied to the first electrode which is positioned on the bottom, or base plate of the first sub-chamber, an electrical discharge, or arc travels upwardly through a conductive gas in the chamber and the first aperture provided in the first interior partition such that the arc enters into the second sub-chamber at an upper position of the chamber. The arc then travels downwardly toward the bottom of the second sub-chamber such that it passes through the second aperture provided in the second interior partition and enters into the third sub-chamber at or near the bottom of the chamber. The arc then travels upwardly through the conductive gas and a third aperture provided at or near the top of the third interior partition and enters the fourth sub-chamber at an upper position in the chamber, and then travels downwardly toward the second electrode provided on the base plate of the fourth sub-chamber.

Figure 3A:
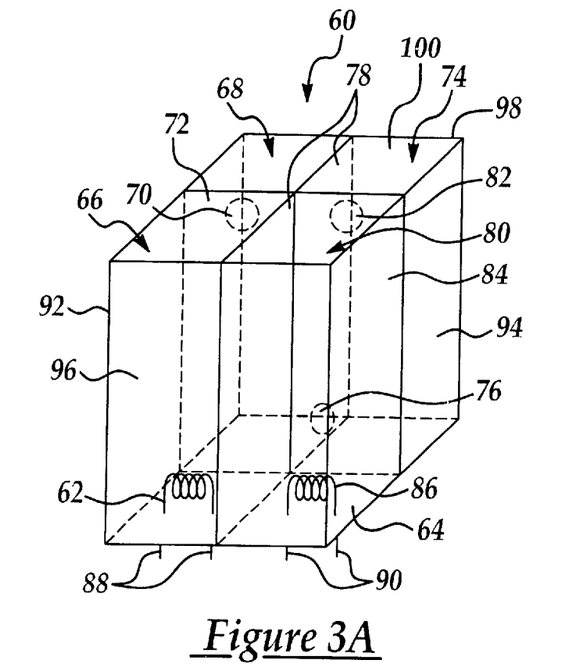
FIG. 3A is a perspective view of a preferred embodiment of the present invention compact fluorescent lamp.

The above scenario can be more easily visualized in the example give in FIG. 3A. It should be noted that in the construction shown as the preferred embodiment of the present invention novel compact fluorescent lamp 60, a first electrode 62 is provided on a base plate 64 of the lamp 60. The first electrode is provided in the first sub-chamber 66, which is in fluid communication with the second sub-chamber 68 through aperture 70 provided at, or near the top of the first interior partition 72.

The second sub-chamber 68 is in turn in fluid communication with the third sub-chamber 74 through a second aperture 76 provided at or near the bottom of the second interior partition 78 which divides the second sub-chamber 68 and the third sub-chamber 74. The third sub-chamber 74 is in turn in fluid communication with the fourth sub-chamber 80 through a third aperture 82 provided at or near the top of the third interior partition 84 which divides the third sub-chamber 74 and the fourth sub-chamber 80. A second electrode 86 is provided on the base plate 64 of the lamp 60 at the bottom of the fourth sub-chamber 80. The first electrode is electrically connected through connectors 88 while the second electrode is electrically connected through connectors 90.

On the interior walls of the two sidewalls 92, 94, two end walls 96, 98, the cover 100, the base 64, and the interior partitions 78, 72 and 84, a chemical substance which is likely a fluorescent powder is coated by an electrostatic coating method, a screen printing method or any other suitable coating techniques. A suitable fluorescent powder for generating a visible light of the daylight color is $Ca_{10}(PO_4)_6$ FCl: Sb, Mn. A suitable fluorescent powder for generating a visible light which has a special white color may be a chemical substance of the same composition but a higher specific gravity of 3.16 than the specific gravity of 3.14 for the composition that generates daylight. Other lamp phosphorus or halo phosphate having similar composition may also be used to produce a cool white light or a white light. The sub-chambers 66, 68, 74 and 80 are filled with a gas which is normally a mixture of a noble gas containing a small percentage of mercury vapor. A visible light is generated in the sub-chamber when the phosphorus fluorescent powder is excited by UV photon from the mercury plasma discharge. The sub-chambers may be filled with any type of noble gas, and preferably with a noble gas of lower cost.

The pair of electrodes 88 and 90 are positioned sufficiently apart in two separate sub-chambers 66 and 80 such that when an electrical power is applied to the electrodes 88 and 90, electrical discharge occurs in the noble gas contained in the sub-chambers 66, 68, 74 and 80 and the gas is energized to cause the phosphor powder to produce visible light.

Figure 3B:
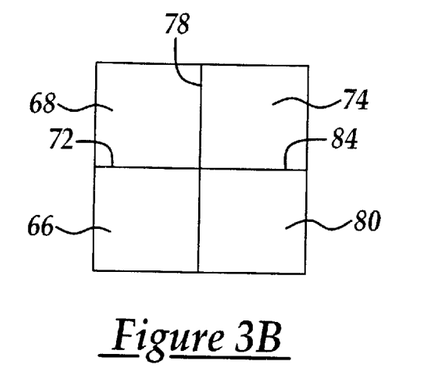
FIG. 3B is a top view of the present invention compact fluorescent lamp of FIG. 3A.
Figure 3C:
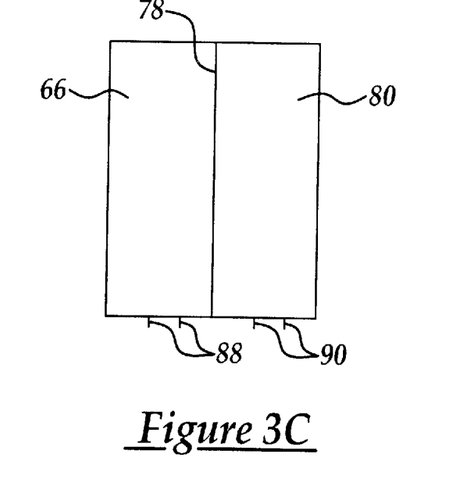
FIG. 3C is a front view of the present invention compact fluorescent lamp of FIG. 3A.

A top view of the present invention compact fluorescent lamp 60 is shown in FIG. 3B, while a front view of the same is shown in FIG. 3C. Another major benefit achievable by the present invention novel compact fluorescent lamp is its ease of manufacturing. A simple method for constructing the compact lamp 60 is by forming the lamp chamber by an adhesive means utilizing a ceramic powder, or commonly known as a sealing glass or glass frit, which contains a glass powder, a binder power and a solvent. A suitable sealing glass materials can be selected from those supplied by the Ferro Corporation of Cleveland, Ohio described as a product line of sealing glasses. For instance, a suitable grade of sealing glasses to be used in assembling the present invention compact lamp is CF1416, which is a vitreous glass with a thermal expansion coefficient of $81 \times 10^{-7}/°$ C. measured between 0 and 300° C., an annealing temperature of 389° C., a softening point of 463° C., a density of 5.26 gm/cc, a sealing temperature of 513° C. and a sealing time of 15 minutes. Another suitable grade of the sealing glass is a vitreous glass of CF7555, which has a thermal expansion coefficient of $88 \times 10^{-7}/°$ C., measured between 0 and 300° C., an annealing temperature of 370° C., a softening point of 415° C., a density of 5.7 gm/cc, a sealing temperature of 450° C., and a sealing time of 15 minutes. These glass powders are generally available in the form of 100, 200 or 325 mesh powders which are suitable for use in forming the present invention compact lamp.

Figure 3D:
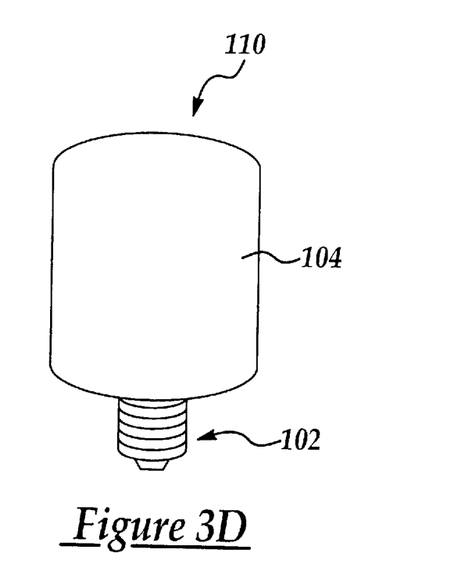
FIG. 3D is a perspective view of the present invention compact fluorescent lamp of FIG. 3A after packaging with a medium lamp base.

A suitable dimension for the present invention compact lamp may be determined based on each particular application. The lamp chamber 60 shown in FIG. 3A may be advantageously mounted in a lamp fixture, such as that shown in FIG. 3D, for providing electrical power thereto. A standard medium socket 102 is used in the lamp fixture 110, while a plastic or glass enclosure 104 may be suitably used to enclose the lamp chamber 60. A transformer (not shown) and a ballaster (not shown) such as those commonly used in commercial applications may be advantageously enclosed in the enclosure 104. The enclosure 104 may further be formed of a translucent material such that a more uniformly diffused light may be achieved by the lamp chamber 60.

Figures 4A, 4B:
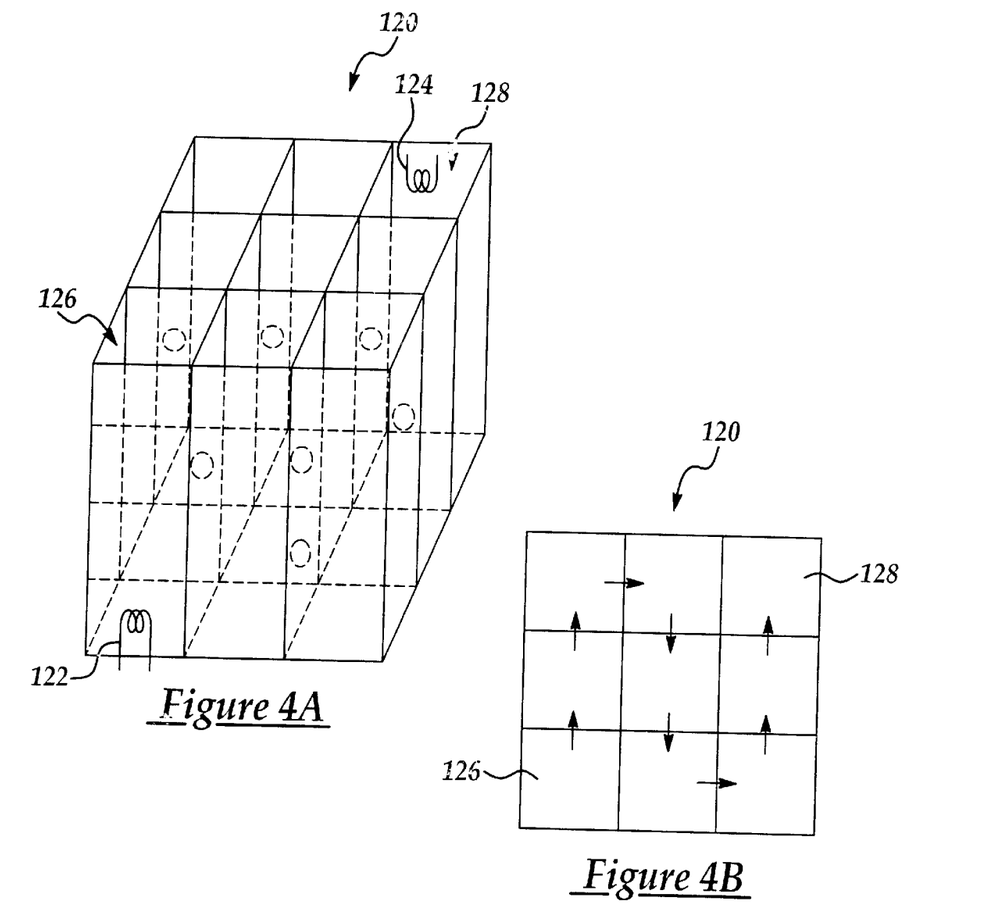
FIG. 4A is a perspective view of an alternate embodiment of the present invention compact fluorescent lamp having nine sub-chambers.
FIG. 4B is a top view of the present invention compact fluorescent lamp of FIG. 4A.
Figure 4C:
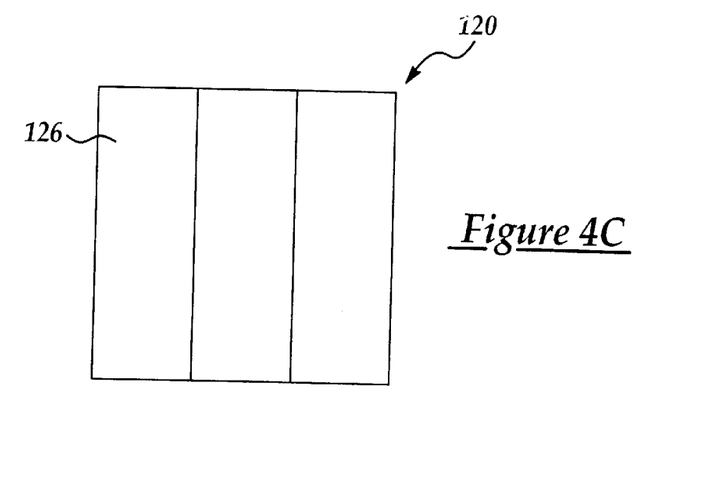
FIG. 4C is a front view of the present invention alternate embodiment compact flourescent lamp of FIG. 4A.

In an alternate embodiment, the discharge length, or the arc length may further be increased by increasing the total number of sub-chambers used. For instance, as shown in FIG. 4A, while keeping the height of the compact lamp 120 similar to the height of the compact lamp 60, the total number of sub-chambers utilized is substantially higher than that utilized in the preferred embodiment, i.e., 9 versus 4. The passageway for the electric discharge or the arc may be designed in any desirable manner as long as a maximum path is achieved. For instance, in the configuration shown in FIG. 4A, the apertures provided on the interior partitions are spaced apart from its neighboring partition such that the electric discharge always travels in an upward or downward direction utilizing the complete height of the lamp fixture 120. As shown in FIG. 4B in a top view, the arrows indicates one of many possible configurations of the discharge path in which two electrodes 122 and 124 are positioned in diagonally opposed sub-chambers 126 and 128. The longer the discharge path the higher the lumen output or the brightness. A front view of the lamp fixture 120 is shown in FIG. 4C.

Figure 5A:
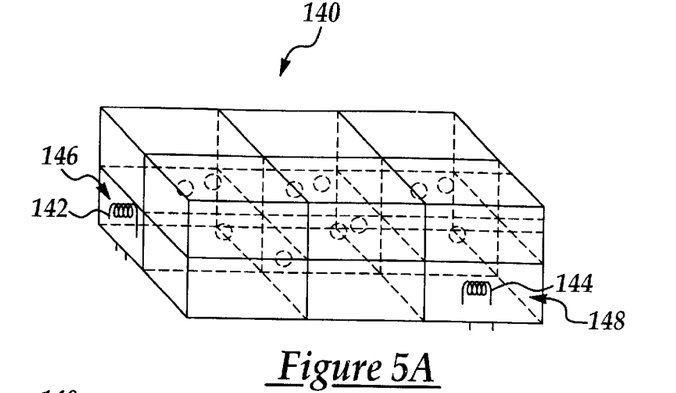
FIG. 5A is a perspective view of another alternate embodiment of the present invention compact fluorescent lamp having twelve sub-chambers.
Figure 5B:
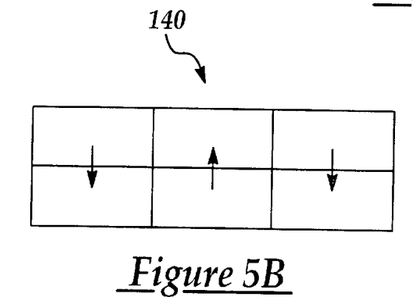
FIG. 5B is a front view of the front row of sub-chambers of the present invention compact flourescent lamp of FIG. 5A.
Figure 5C:
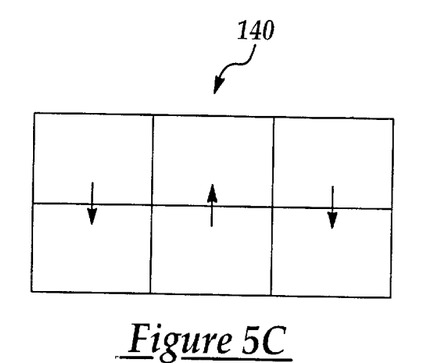
FIG. 5C is a front view of the back row of the present invention compact fluorescent lamp of FIG. 5A.
Figure 5D:
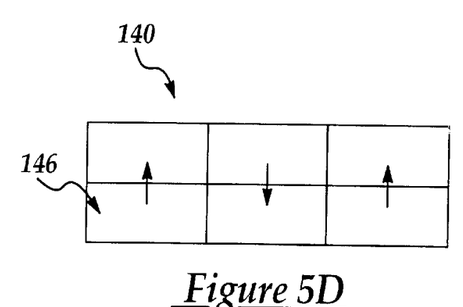
FIG. 5D is a top view of the top layer of sub-chambers of the present invention compact fluorescent lamp of FIG. 5A.
Figure 5E:
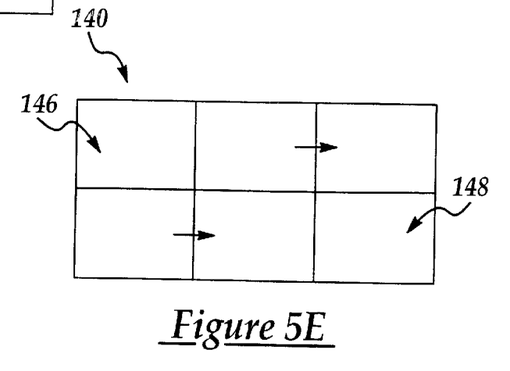
FIG. 5E is a top view of the bottom layer of sub-chambers of the present invention compact fluorescent lamp of FIG. 5A.

In another alternate embodiment shown in FIGS. 5A~5E, a more complicated configuration consisting of a total of twelve sub-chambers are utilized in a lamp fixture 140. As shown in FIG. 5A, a first electrode 142 is positioned in a first sub-chamber 146, while a second electrode 144 is positioned in a diagonally opposite sub-chamber 148. Front views of the front row and the back row are shown in FIGS. 5B and 5C respectively. The arrow indicates the path of an electric discharge, or arc. Top views for the top layer and the bottom layer are shown in FIGS. 5D and 5E, respectively. Similarly, arrows indicate the flow of the discharge path.

The present invention novel compact flourescent lamp and a method for manufacturing have therefore been amply demonstrated in the above descriptions and in the appended drawings of FIGS. 3A~5E. It should be noted that the examples given in the preferred embodiment, in the alternate embodiment and in the second alternate embodiment are merely illustrations for an infinite number of possible configurations utilizing the present invention novel concept.

While the present invention has been described in an illustrative manner, it should be understood that the terminology used is intended to be in a nature of words of description rather than of limitation.

Furthermore, while the present invention has been described in terms of a preferred and several alternate embodiments, it is to be appreciated that those skilled in the art will readily apply these teachings to other possible variations of the inventions.

The embodiment of the invention in which an exclusive property or privilege is claimed are defined as follows:

What is claimed is:

1. A compact fluorescent lamp for illumination comprising:
    a lamp body constructed by two sidewalls, two end walls, a cover and a base forming a hermetically sealed chamber cavity therein,
    at least one interior partition within the chamber cavity forming at least two sub-chambers, said at least one interior partition having at least one aperture hole therethrough to provide fluid communication between said at least two sub-chambers, said at least one aperture hole being positioned on said at least one partition in such a way that a maximum length of passageway by a subsequently generated electrical discharge is achieved in said at least two sub-chambers,
    at least one chemical substance coated on interior walls including said at least one interior partition and inside surfaces of said two sidewalls, two end walls, said cover and said base, said chemical substance produces visible light when energized by a radiant energy,
    a pair of spaced-apart electrodes each situated in a different sub-chamber of said at least two sub-chambers for providing an electrical discharge in said at least two sub-chambers, and
    a gas filling said at least two sub-chambers which when charged by said electrical discharge emits a radiant energy to energize said at least one chemical substance coated on said interior walls to produce visible light.

2. A compact fluorescent lamp for illumination according to claim 1, wherein said two sidewalls, two end walls, cover and base have a planar surface.

3. A compact fluorescent lamp for illumination according to claim 1, wherein said two sidewalls, two end walls, cover and base have a planar surface in either a rectangular or a square shape.

4. A compact fluorescent lamp for illumination according to claim 1, wherein said lamp having at least two interior partitions within the chamber cavity forming four sub-chambers.

5. A compact fluorescent lamp for illumination according to claim 4, wherein said lamp further comprising three apertures with one provided on each of three partitions which divide said four sub-chambers, said three apertures being positioned such that a maximum length of passageway of said electrical discharge is achieved in said four sub-chambers.

6. A compact fluorescent lamp for illumination according to claim 1, wherein said lamp having at least three interior partitions within the chamber cavity forming six sub-chambers.

7. A compact fluorescent lamp for illumination according to claim 6, wherein said lamp further comprising five apertures with one provided on each of five partitions which divide said six sub-chambers, said five apertures being positioned such that a maximum length of travel by said electrical discharge is achieved in said six sub-chambers.

8. A compact fluorescent lamp for illumination according to claim 1, wherein said lamp having at least four interior partitions within the chamber cavity forming nine sub-chambers.

9. A compact fluorescent lamp for illumination according to claim 8, wherein said lamp further compressing eight circular holes with one provided on each of seven partitions which divide said nine sub-chambers, said eight circular holes being positioned such that a maximum length of travel by said electrical discharge is achieved in said nine sub-chambers.

10. A compact fluorescent lamp for illumination according to claim 1, wherein said chemical substance is a phosphor containing substance.

11. A compact fluorescent lamp for illumination according to claim 1, wherein said chemical substance produces a visible light selected from the group consisting of daylight, special white light, cool white light and white light.

12. A compact fluorescent lamp for illumination according to claim 1, wherein said chemical substance is coated on said interior walls by either an electrostatic coating method or a screen printing method.

13. A compact fluorescent lamp for illumination according to claim 1 further comprising reflecting coating layers coated on outwardly-facing interior walls in said lamp for improving brightness.

14. A compact fluorescent lamp for illumination according to claim 1, wherein said two sidewalls, two end walls, a base and interior partitions are formed of sodium containing glass.

15. A compact fluorescent lamp for illumination according to claim 1, wherein said two sidewalls, two end walls, base and interior partitions are assembled together by adhesive means.

16. A compact fluorescent lamp for illumination according to claim 1, wherein said two sidewalls, two end walls, base and interior partitions are assembled together by adhesive means utilizing a sealing glass material.

17. A compact fluorescent lamp for illumination according to claim 1, wherein said two sidewalls, two end walls, cover, base and interior partitions are formed of sodium glass and adhered together by a glass frit.

18. A compact fluorescent lamp for illumination according to claim 1, wherein said at least two sub-chambers comprises twelve sub-chambers formed by planar sodium glass plates.

* * * * *